United States Patent [19]

Da Silva et al.

[11] Patent Number: 5,437,302

[45] Date of Patent: Aug. 1, 1995

[54] EQUIPMENT FOR THE INTERCONNECTION OF TWO LINES TO ALLOW RUNNING OF PIGS

[75] Inventors: José Eduardo M. Da Silva; Antônio Carlos F. Lino; Zephyrino L. Machado Filho; Marcelo José B. Teixeira, all of Rio de Janeiro, Brazil

[73] Assignee: Petroleo Brasileiro S.A. - PETROBRAS, Rio de Janeiro, Brazil

[21] Appl. No.: 100,920

[22] Filed: Aug. 3, 1993

[30] Foreign Application Priority Data

Aug. 3, 1992 [BR] Brazil .................................. 9203009

[51] Int. Cl.⁶ .............................................. B08B 9/04
[52] U.S. Cl. .................................. 137/242; 15/104.62; 137/268
[58] Field of Search .................... 137/242, 268; 15/3.5, 15/104.62, 104.63; 166/70

[56] References Cited

U.S. PATENT DOCUMENTS

| 3,186,014 | 6/1965 | Allen | 15/104.062 |
| 3,224,247 | 12/1965 | Barrett | 15/104.06 Z X |
| 3,246,666 | 4/1966 | Park et al. | 137/268 |
| 3,288,163 | 11/1966 | Craven | 15/104.06 Z X |
| 3,397,570 | 8/1986 | Pfrehm | 15/104.06 Z X |
| 3,504,523 | 4/1970 | Layhe | 137/268 X |
| 3,562,014 | 2/1971 | Childers | 15/104.062 X |
| 4,574,830 | 3/1986 | Rickey et al. | 15/104.062 X |

*Primary Examiner*—Stephen M. Hepperle
*Attorney, Agent, or Firm*—Sughrue, Mion, Zinn, Macpeak & Seas

[57] ABSTRACT

A device is provided for the interconnection of two flexible flowlines extending between a subsea production station and a surface facility to allow running of a pig from one line to another. The device is a modular crossover apparatus which includes a control valve connected between two curved pipelines and a pair of substantially Y-shaped connections inserted in the flowlines respectively with ends of the curved pipelines remote from the control valve connected to the connections.

2 Claims, 3 Drawing Sheets

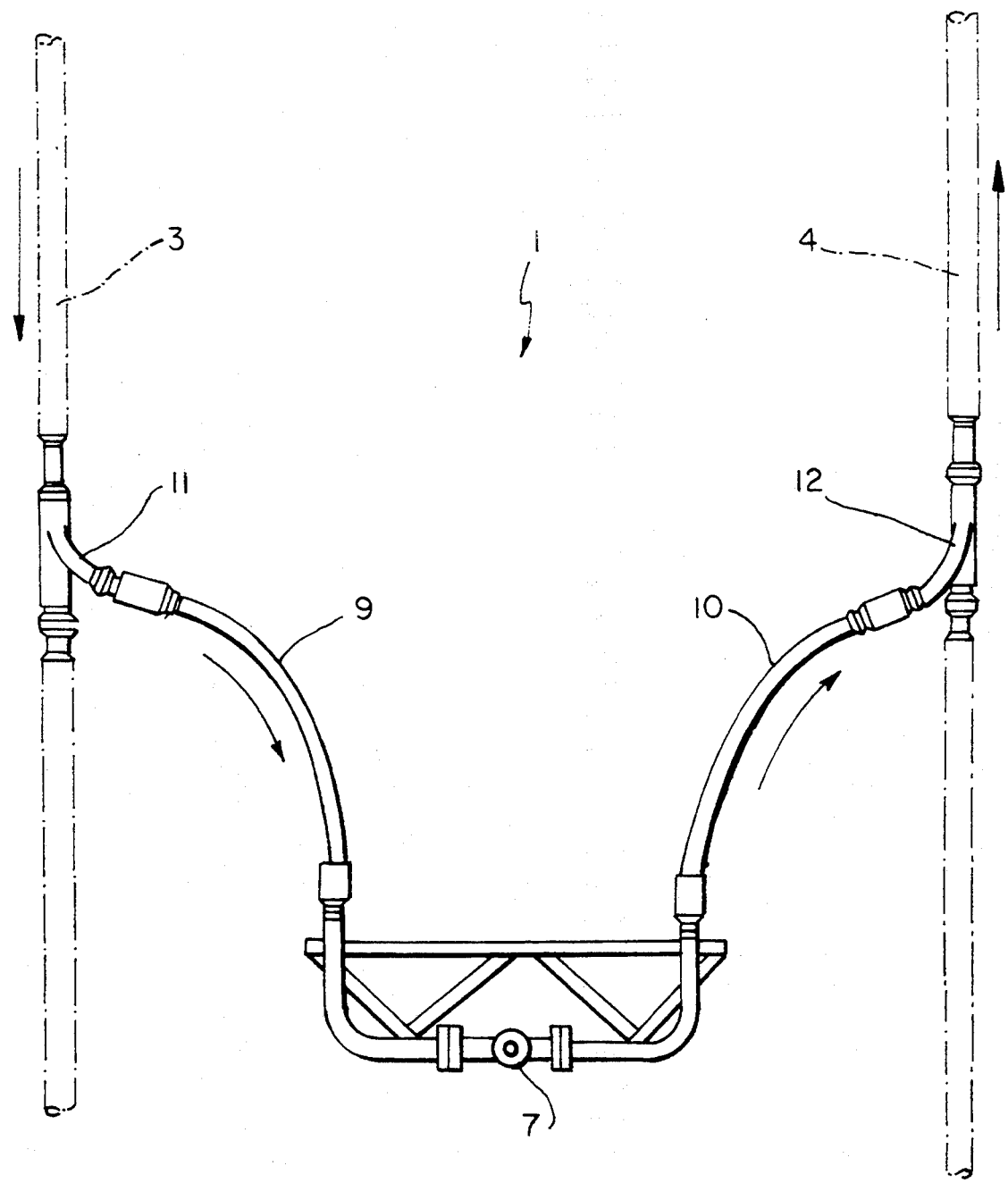

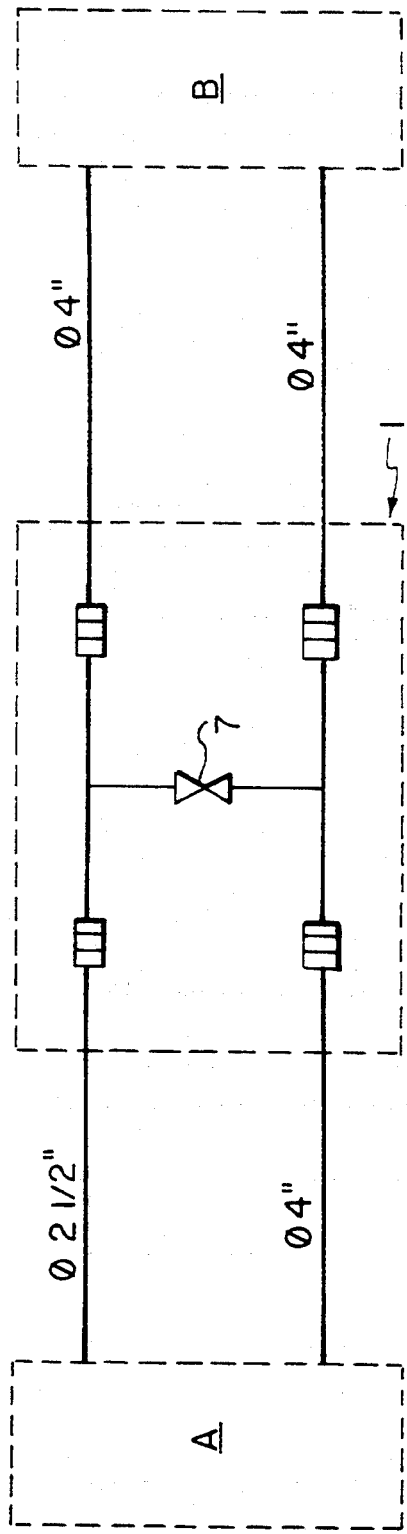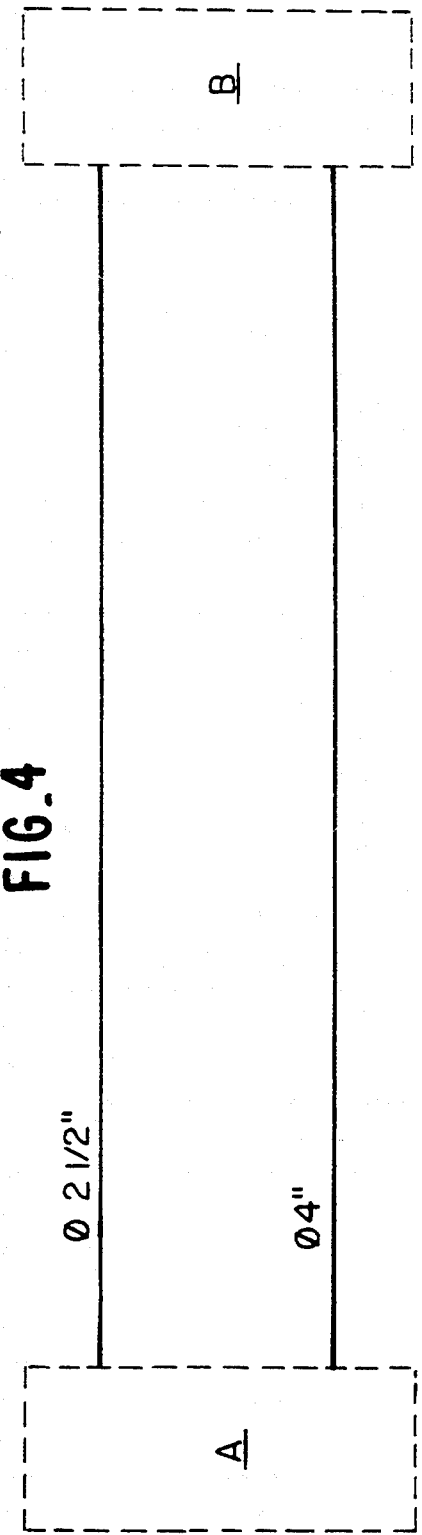

EQUIPMENT FOR THE INTERCONNECTION OF TWO LINES TO ALLOW RUNNING OF PIGS

BACKGROUND OF THE INVENTION

1. Field of the Invention

The present invention relates to an equipment designed to enable a travelling device called "pig" to pass through a flow line of a product that can form deposits on said line and cause clogging or other problems, such as a flow load loss.

More specifically, the invention is an equipment which, when installed at any intermediate point of a product flow line system, enables a pig introduced into an opening of one of the lines, referred to as an "inlet connection" to run through said line up to a point where, under the effect of a control by a valve specially located at a return curve on the equipment provided by the invention, it can return through a different line, to be cleared, and be withdrawn, after the removal of the material dragged along by the pig, through an opening referred to as an "outlet connection".

2. Description of the Prior Art

The line cleaning device called pig is a piece usually made of a polymeric elastomer (it can also be made of other, less appropriate materials, including metal) and having a widely-varying shape, usually cylindrical (it can also be spherical), or comprising several flexible discs, connected by a flexible, plastic or pivoted, metal shaft, being provided or not with abrasive members intercalated. Such device is inserted in a place in the piping and, afterwards, fluid pressure (gas or liquid) is applied, driving intensively said pig in its travel inside the piping, where it drags to the end of the piping (or to an intermediate point for removal) the undesirable material deposited on the internal walls of the piping.

The term employed to designate the travelling device introduced inside the piping is the English word "pig" of a controversial origin. However, as the Brazilian Portuguese term chosen, especially for purchasing purposes on the Brazilian market, "raspador" (scraper), does not properly define the object, experts in this field have opted for the English word, which is universally accepted. For this reason, said "travelling" object is here simply designated as "pig".

On deep-water well oil flowlines leading to certain points on the surface (such as a platform), when an obstruction is formed by the accumulation of materials such as "paraffin", there is no physical condition of sending a cleaning pig and recovering it because the "final" portion of the piping is in deep waters. In cases where such cleaning is imperative, a common solution in the art has been to remove (with a lot of work and at a great cost) the piping to the surface and to replace it with a new one, and the obstructed piping should be cleaned on the surface by convenient methods, including the use of pigs made of polymeric material.

To overcome this obstacle, the prior art has developed, among other concepts not relevant for understanding the present invention., the pig passing concept referred to as "pigging loop". However, within this concept, the current practice only provides for the connection of two lines having the same diameter incorporated into the design of an under-sea equipment close to an oil-producing well (e.g., a Christmas tree or a template manifold), so that a pig is sent through one of them and is returned through the other. With this design option, the production line has, compulsorily and permanently, the same diameter as the water and/or gas injection line (or a secondary production line or also an additional service line ).

Although progress has been made to facilitate pig operations in pipings having portions that are difficult to reach, such as the offshore oil production pipings already described, there remains the drawback of little operational flexibility, for it requires definitive modifications to the internal design of said undersea equipment (e.g., a Christmas tree or a template manifold) and lines having the same diameter, for the pig circulation, even in those cases where such pig is not necessary in view of the inherent characteristics of the fluid being carried, thus causing a significant and, above all, unnecessary increase in the costs of offshore oil-producing systems. It cannot be used either on systems already existing when the undesirable deposit formation appears late on said undersea piping, for it would force the full replacement of the whole producing system, including the fixed production equipment, causing serious losses.

SUMMARY OF THE INVENTION

In order to tackle practically and economically such problems, the invention herein described presents an equipment especially designed to be inserted in a portion of the piping, to enable a pig to be launched through a line of an existing system and to cause said pig to return through another line (usually but not necessarily parallel to the line where the pig was launched), which is the line where undesirable material accumulates, through which the pig travels, pushing undesirable deposits to a point on the surface from where said deposits are to be removed, after which the pig is recovered.

BRIEF DESCRIPTION OF THE DRAWINGS

In order that those skilled in the art may appreciate better the advantages of the present invention, reference should be made to the attached drawings, in which:

FIG. 3 is an schematic view seen from above of an equipment of the invention mounted on well production and operation lines;

FIG. 4 shows a simplified diagram of the ratio of nominal diameters of the lines involved in production, without the use of the equipment of the invention;

FIG. 5 shows an equipment of the invention mounted at an intermediate point on the line, showing the variation in the piping diameters.

DESCRIPTION OF A PREFERRED EMBODIMENT

Figure 1:
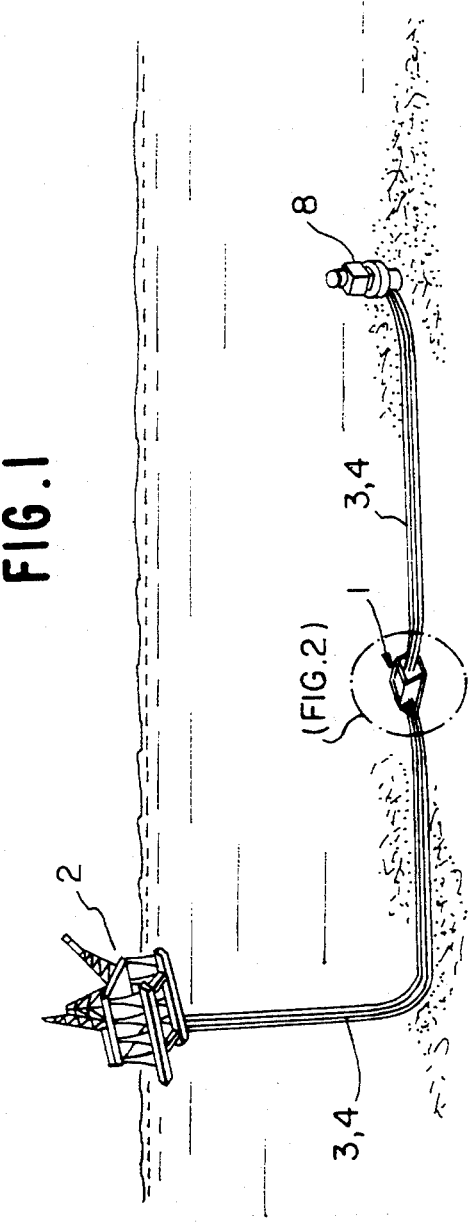
FIG. 1 is an schematic and general view of the location of the equipment object of the present invention in relation to the platform on the surface and to a production well (represented by a wellhead, including a wet Christmas tree)

With reference to FIG. 1, we see that equipment 1 (object of the present invention) can be located at an intermediate point between an oil collection central (for example, surface platform 2) and the satellite wellhead (including the Christmas tree) 8. The lines making this connection are shown here as a single-line member, for purposes of simplification, although two parallel lines can be seen in a careful observation, for we know that at least two pipings should be provided, preferably but not necessarily parallel to one another, said pipings being designated 3 and 4. There are also the umbilicals for carrying hydraulic fluid for the control of the valves of the equipment and the Christmas tree.

Figure 2:
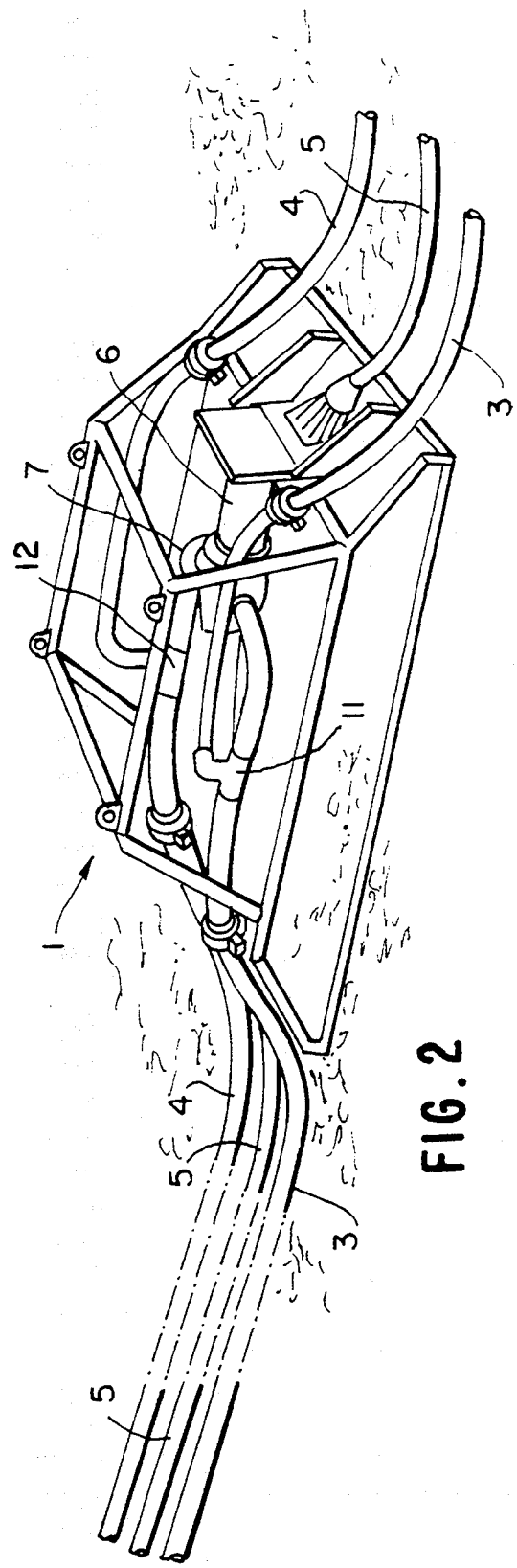
FIG. 2 is a closer view in perspective of the equipment shown in FIG. 1.

FIG. 2 shows a closer view of the equipment supported on the sea bottom, with the arrangement of the pipings and the various components being clearly seen. Here the device supporting the equipment is shown without too many constructive features, the purpose being to provide a more realistic vision, and no greater descriptive attention should be given to such component.

We shall give a more detailed look at FIG. 3 because it enables a clearer understanding of the functioning of the equipment. In FIG. 3, line 3 carries the auxiliary fluid for injection into the well, and line 4 carries the oil being sent to the surface. By way of an example only, we see here that the arrow placed at the side of the pipings indicates the direction of movement of a pig in an operation for removing undesirable products. The two lines can be seen to be parallel to one another, which is actually preferable because it is more convenient for launching purposes. However, they need not be parallel to one another. This very important operational aspect does not, however, interfere with the spirit and scope of the present invention, and it is presented here only for the sake of coherence to make visualization easier.

Connections 11 and 12, shown in FIG. 3 and also in perspective in FIG. 2, show how curved pipelines 9 and 10 are connected, said lines being, respectively, the inlet and outlet curves of equipment 1 proper. Each of the connections 11 and 12 has a substantially Y-shaped configuration with a base portion of the Y extending toward the surface platform 2, a first branch extending toward the well head 8 and a second branch connected to curved pipelines 9 and 10 respectively. Thus it is seen that, with valve 7 open, which is provided by remotely-controlled, direct actuation member 6, the pig is allowed to pass from line 3 to line 4 after entering curved pipeline 9 of equipment 1 from connection 11 and passing through valve 7, curved pipeline 10 and connection 12. The signal transmission devices for actuating the opening and closing member of valve 7 are not shown in FIG. 3, because they are common items in an automatic control technique, although conductor 5, containing the umbilicals, is visible in FIG. 2. Here, only as a basis for reasoning, we regard that the assembly comprising line 4 and connection 12 carries oil from the well to the surface, while the assembly consisting of line 3 and connection 11 carries the fluid from the surface to the well.

It is also important to note that generally equipment 1 is practically attached to an intermediate point of the well service pipings. However, if said equipment is supported on the sea bottom, a support lattice may be provided for it, not only to impart shape stability to it, but also to ensure equal distance from the lines. This also makes it easy to move the whole assembly, including equipment 1, as shown in FIGS. 2 and 3. The constructive definition of this lattice, however, is not an essential item of the present invention and, for this reason, it is not described in detail.

FIGS. 4 and 5 show how equipment 1 of the present invention can be a piping arrangement alternative in an oil flow system in relation to the flow of fluid for injection into the well, enabling the use of a pig to be visualized.

In equipment 1, shown in FIG. 5, the pig is sent through the top line, from station "B" towards station "A" (as shown by the arrow). On station "A" (for example) we have a wet Christmas tree and on station "B" for example, we have a platform or any other station on the surface. Through the bottom line, Christmas tree "A" for example, sends the oil produced to station "B" (for example, a platform).

In FIG. 4, we have the conventional case in which the injection fluid is sent through a top line, having, for example, 2 ½" (about 6.55 cm) in diameter, from station "B" to station "A" while the bottom line, having, for example, a diameter of 4" (about 10 cm), sends the oil from station "A" to station "B".

In FIG. 5, where equipment 1 of the present invention is seen mounted (including intermediate valve 7), the upper piping, mounted between station "B" and station "A" for sending injection fluid, would have a diameter of 4" (about 10 cm) up to the branching point of equipment 1 leading to valve 7, and 2 ½" (about 6.35 cm) from the branching point to station "A". By contrast, the lower piping would have a diameter of 4" (about 10 cm) throughout its length, to carry oil from station "A" to station "B". As shown, the branching line interconnecting the top and bottom lines and the inside diameter of full-passage valve would be 4" (about 10 cm). This means that the pig can be sent without undergoing a major diameter restriction by compression when leaving station. "B" to undergo a remarkable expansion from 2 ½" to 4" (from 6.35 cm to 10 cm). Throughout its passage inside the piping, the pig would go through pipes having the same diameter, which increases its efficiency.

However, it should be noted that piping diameters are only defined as an example of certain cases encountered in practice and having an explanatory effect, and they are not restrictive of the present invention, since arrangements of pipes carrying products and auxiliary fluids, as well as the tubular members of said equipment 1, can generally encompass the whole range of inside (Or nominal) diameters possible, as will be readily understood by those skilled in the art.

A further advantage of the use of the equipment of the present invention can be glimpsed: the equipment should be placed intercalated inside the line taking into account only the length where practice has shown obstruction by undesirable products to be more frequent or more likely as a result of the conditions of the oil being produced or of environmental conditions (water temperature, depth, etc.). This means an economy in the installation of equipment 1, for such installation can be made at an easily-hoistable portion or a portion requiring less labour for launching. It is obvious that this aspect does not eliminate, in critical cases, the demand for special pigs that may undergo compression on their travel or expansion, when this represents some operational advantage for any other reason, although it is not immediately desirable in normal cases.

Additional, easily-perceived advantages of the present invention are for example:

a) as it is easy to intercalate said equipment 1 at any point on the piping, without the need to always reach the well head at great depths, it is not necessary to redesign the already existing equipment; all that is required is that said equipment 1 of the invention has piping and operating valve diameters compatible with the system where it is to be employed;

b) as a result, it becomes possible to pass a pig for any purpose (line cleaning, line calibration, checking of the working volume, etc.) on any system, including those already installed;

c) it is also possible to use the pressure of the fluid normally available in an oil well operation to drive a pig, thus eliminating the extremely high cost of additional compression facilities.

We claim:

1. A device for the interconnection of two flexible flow lines adapted to extend between a subsea production station and a surface facility to allow running of pigs from one line to another, said device comprising a modular crossover apparatus including a control valve connected between two curved pipelines and a pair of substantially Y-shaped connections insertable in said flow lines respectively with ends of said curved pipelines remote from said control valve being connected to said Y-shaped connection whereby upon selective actuation of said control valve to an open position, a pig can be launched from the surface facility through a first of said flow lines, passed through said crossover apparatus and returned through a second of said flow lines to clean said second flow line and push all debris back to said surface facility.

2. A device according to claim 1, wherein each of said Y-shaped connections includes a base portion adapted to be connected to a flow line extending toward a surface facility, a first branch adapted to be connected to a flow line extending toward the subsea production station and a second branch connected to one of said curved pipelines.

* * * * *